Figure 1:
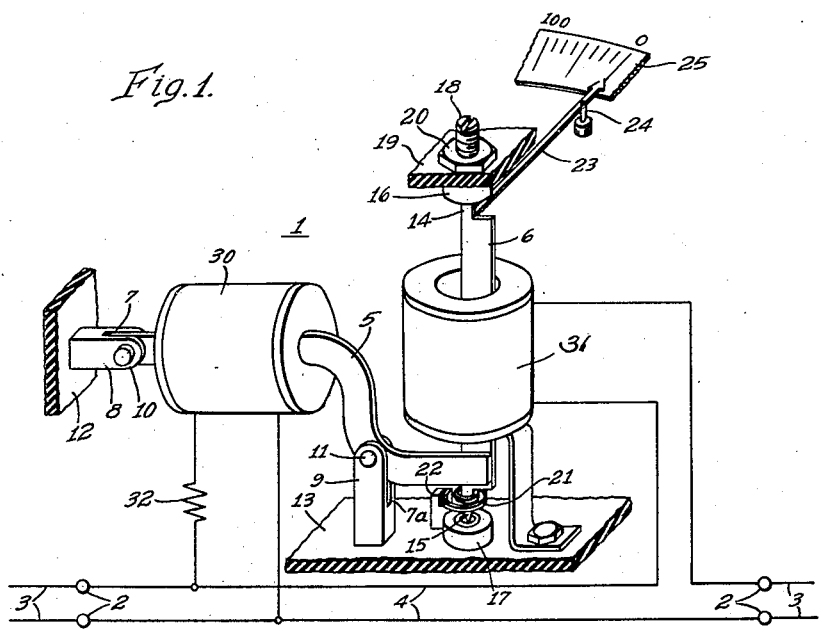

Jan. 23, 1945.　　　H. F. BUSH ET AL　　　2,367,926

ELECTRICAL MEASURING INSTRUMENT

Filed April 1, 1942

WITNESSES:
C. J. Weller.
C. L. Freedman

INVENTORS
Richard C. Hitchcock
and Howard F. Bush.
BY
ATTORNEY

Patented Jan. 23, 1945

2,367,926

UNITED STATES PATENT OFFICE 2,367,926

ELECTRICAL MEASURING INSTRUMENT

Howard F. Bush, East Orange, N. J., and Richard C. Hitchcock, Indiana, Pa., assignors to Westinghouse Electric & Manufacturing Company, East Pittsburgh, Pa., a corporation of Pennsylvania Application April 1, 1942, Serial No. 437,236

9 Claims. (Cl. 171—34)

This invention relates to electrical measuring devices and it has particular relation to electrical measuring instruments of the moving magnetic vane or moving iron type for measuring a function of two variable quantities.

For measuring single variable quantities such as electrical voltage or current, it is conventional practice in the art to employ an instrument of the moving magnetic vane or moving iron type. Such an instrument is illustrated and described in the Young et al. Patent 2,157,947. The specific instrument therein disclosed is of the repulsion type. Because of the simplicity and sturdiness of moving magnetic vane or moving iron instruments, it is desirable that their fields of application be extended to cover the measurement of a function of two variable quantities such as watts or vars.

In accordance with the invention, a movable magnetic vane is subjected to a plurality of magnetic fields. To provide an indication of the power flowing in an electrical circuit, the magnetic vane is subjected to a first magnetic field which magnetizes the vane in accordance with the current flowing in an electrical circuit and a second magnetic field controlled by the voltage of the electrical circuit. These fields are so related that they produce a magnetic force operating to move the magnetic vane in accordance with the power of the electrical circuit.

In a specific embodiment of the invention, a fixed magnetic vane and a movable magnetic vane are so related that when magnetized, they produce a magnetic force therebetween tending to move the movable magneic vane. To magnetize these vanes, each vane is provided with a separate winding. One of the windings is energized in accordance with the voltage of an electrical circuit whereas the remaining winding is energized in accordance with the current flowing in the electrical circuit. Consequently, movement of the movable magnetic vane depends on the power of the electrical circuit. Preferably the windings are so disposed that they have substantially no mutual inductive coupling.

It is, therefore, an object of the invention to provide an improved measuring device for measuring a function of two variable quantities.

It is a further object of the invention to provide a measuring instrument comprising a pair of relatively movable magnetic members each having a separate magnetizing winding associated therewith.

It is a still further object of the invention to provide a measuring device having a pair of relatively movable magnetic members each provided with a separate magnetizing winding, the windings being disposed to have substantially no mutual inductive coupling.

Figure 2:
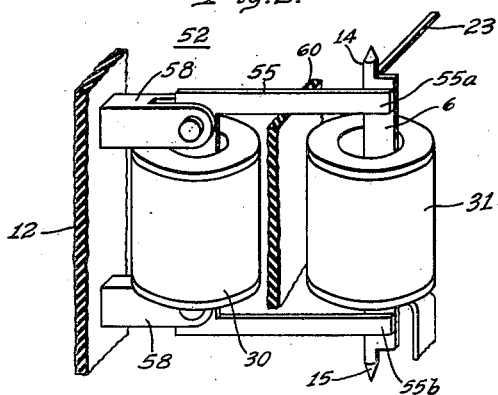
Figure 3:
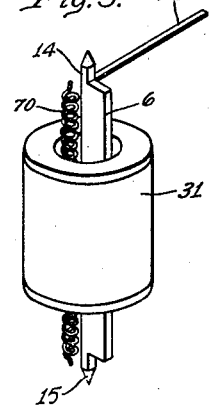
Figure 4:
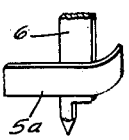

Other objects of the invention will be apparent from the following description taken in conjunction with the accompanying drawing, in which:

Figure 1 is a schematic view with parts in perspective and parts broken away of a measuring device embodying the invention; and Figs. 2, 3 and 4 are views in perspective with parts broken away of modifications of the measuring device illustrated in Fig. 1.

Referring to the drawing, Fig. 1 shows a measuring device 1 having a plurality of terminals 2. If it is desired to provide a measurement of the watts or vars of an electrical circuit 3, the electrical circuit is connected to the terminals 2 to energize a local electrical circuit 4 of the measuring device 1. Energization of the measuring device is derived through the local electrical circuit 4.

The measuring device 1 includes a fixed magnetic vane 5 and a movable magnetic vane 6. In the specific embodiment illustrated in Fig. 1, the fixed magnetic vane 5 may be positioned in slots 7 and 7a formed respectively in abutments 8 and 9. The magnetic vane 5 may be attached to the abutments in any suitable manner as by rivets 10 and 11. The abutments 8 and 9 are secured to fixed supports 12 and 13.

The movable magnetic vane 6 is provided with bearing pins 14 and 15 which are received in suitable bearing cups 16 and 17, respectively. Preferably the bearing cups 16 and 17 are of the jewel-type. If desired, either or both of the bearing cups 16 and 17 may be adjustable. As illustrated in Fig. 1, the upper bearing cup 16 is provided with a screw-threaded portion 18 which is in threaded engagement with a fixed support 19. A lock nut 20 is provided for securing the bearing cup in any position to which it is adjusted. The lower bearing cup 16 may be similarly attached to the fixed support 13.

When the measuring device 1 is deenergized, the movable vane 6 is biased yieldably towards a zero position by any suitable means such as a spiral spring 21 which has its inner end attached to the pin 15. The outer end of the spiral spring 21 may be adjustably attached to an abutment 22 carried by the fixed support 13.

To indicate the extent of rotation of the movable magnetic vane 6, a suitable indicating device such as a pen or pointer may be connected to the movable vane 6. In Fig. 1, a pointer 23 is illustrated as attached to the movable magnetic vane 6 for rotation therewith. When the measuring device 1 is deenergized, the pointer 23 is biased into contact with a stop pin 24 by means of the spiral spring 21. A scale 25 may be associated with the pointer for indicating the movement thereof. For the purpose of illustration, the scale 25 is provided with arbitrary values 0 and 100.

The invention may be more readily understood by a brief résumé of the theory of operation of the magnetic vanes 5 and 6. By inspection of Fig. 1, it will be observed that the magnetic vanes 5 and 6 have adjacent polar portions which are separated from each other by a small air gap. If the magnetic vanes are magnetized to produce opposite polarities in these polar portions, a magnetic force is produced between the two magnetic vanes which tends to attract the movable magnetic vane 6 towards the fixed magnetic vane 5.

On the other hand, if the magnetic vanes 5 and 6 are magnetized to produce the same polarity in the adjacent polar portions, a magnetic force of repulsion is produced tending to urge the movable magnetic vane 6 away from the fixed magnetic vane 5. The direction of movement or rotation of the magnetic vane 6 is such as to carry the pointer 23 away from the stop pin 24 against the resistance of the spiral spring 21. It will be observed that the resisting force developed by the spiral spring 21 increases with displacement of the pointer 23 up scale.

If both of the magnetic vanes 5 and 6 are magnetized in accordance with a single variable quantity such as voltage, the scale 25 may be calibrated to read the value of the voltage directly. Similarly, if both of the magnetic vanes are magnetized in accordance with electrical current, the scale 25 may be calibrated to indicate directly the value of the current.

However, if one of the magnetic vanes is magnetized in accordance with current and the remaining magnetic vane is magnetized in accordance with voltage of an electrical circuit, the resulting movement of the pointer 23 is in accordance with a function of both current and voltage. Such movement may be utilized to indicate the value of a function such as the power or reactive volt amperes of the associated electrical circuit.

To magnetize the magnetic vanes 5 and 6 independently, each of the magnetic vanes may be provided with a separate winding 30 and 31, respectively. Either of these windings may be energized in accordance with the voltage of an electrical circuit. If the remaining winding is energized in accordance with the current of the same electrical circuit, the movement of the associated pointer 23 may be utilized to indicate watts or vars as previously set forth. For the purpose of illustration, it will be assumed that the winding 30 is energized in accordance with voltage whereas the winding 31 is energized in accordance with current. Generally the voltage winding has a large number of turns of small diameter electrical conductor, whereas the current winding has a relatively small number of turns of large diameter electrical conductor.

By inspection of Fig. 1, it will be observed that the winding 30 is connected for energization in accordance with the voltage of the local electrical circuit 4. Also, it will be observed that the winding 31 is energized in accordance with current flowing through the local electrical circuit 4. Consequently, if the terminals 2 are connected to an electrical circuit 3, the measuring device 1 may be utilized to measure a function of the voltage and current present in the electrical circuit 3.

If the measuring device 1 is employed for measuring direct current quantities, the polarities of the windings 30 and 31 may be adjusted to provide similar polarities in the adjacent portions of the magnetic vanes 5 and 6. With such an adjustment, energization of the windings 30 and 31 results in movement of the pointer 23 up scale to indicate the value of power flowing in the electrical circuit 3. For such service, the magnetic vanes 5 and 6 may be formed of any suitable magnetic material having high magnetic permeability, low magnetic coercivity and low magnetic retentivity, such as soft iron.

If the measuring device 1 is designed for alternating current measurements, energization of the windings 30 and 31 must be adjusted to produce not only correct polarities in the magnetic vanes 5 and 6, but also proper phase relationships between the magnetic fluxes flowing in the two magnetic vanes. For this reason, it may be generally desirable to provide a suitable phase shifter represented in Fig. 1 by an impedance 32 for controlling the phase relationships between currents flowing in the windings 30 and 31.

For measuring real power flowing in the alternating current electrical circuit 3, currents flowing in the windings 30 and 31 should be in phase when the electrical circuit 3 is operating at unity power factor. The correct phase relationship may be established in this case by designing the impedance 32 to provide a capacitive reactance sufficient to balance the inductive reactance of the winding 30. The resistances of the impedance 32 and of the winding 32 then determine the current flow therethrough. With such an impedance provided and with the windings connected to provide repulsion between the magnetic vanes 5 and 6, the scale 25 may be calibrated to indicate directly the power flowing in the electrical circuit 3.

To measure reactive volt-amperes or vars flowing in the alternating current electrical circuit 3, the currents flowing in the windings 30 and 31 should be in phase when the electrical circuit 3 is operating at zero power factor. For this purpose, the impedance 32 may be designed to add a substantial inductive reactance to the winding 30. Such inductive reactance lags the current flowing through the winding 30 substantially 90° from the applied voltage. This means that when the electrical circuit 3 operates at unity power factor, the currents flowing through the windings 30 and 31 are substantially in phase. Therefore, the scale 25 may be calibrated to read directly the value of reactive amperes or vars flowing in the electrical circuit 3. Any suitable compensator or phase shifter may be employed to provide the desired phase relationship.

For alternating current operation, the magnetic vanes 5 and 6 may be formed with a small cross section or may be formed of laminated thin strips of magnetic material in order to reduce magnetic losses therein. Also, it is desirable that the mutual inductive coupling between the windings 30 and 31 be substantially eliminated. Such elimination is effected substantially by disposing the windings 30 and 31 with their axes at right angles to each other. With such an arrangement, the interaction between the two windings is substantially eliminated.

By an inspection of Fig. 1, it will be observed that the movable vane 6 rotates within the winding 31. In order to prevent such rotation from substantially affecting the magnetization of the magnetic vane 6, the magnetic vane 6 is designed to rotate about an axis which preferably coincides with the axis of the winding 31.

It is believed that the operation of the invention is apparent from the foregoing discussion. If it is desired to measure the power flowing in the electrical circuit 3, the terminals 2 of the measuring device 1 are connected into the electrical circuit 3. As a result of such connection, the winding 30 is energized in accordance with the voltage of the electrical circuit 3, whereas the winding 31 is energized in accordance with the current flowing in the electrical circuit 3. The currents flowing in the windings 30 and 31, respectively, magnetize the magnetic vanes 5 and 6. Since the windings 30 and 31 are adjusted to produce the same polarities in the adjacent portions of the magnetic vanes 5 and 6, a magnetic force of repulsion is developed which tends to move pointer 23 up scale against the resistance of the spiral spring 21. Since the magnetic force operating on the movable vane 6 is produced by magnetizations dependent respectively on the voltage and current of the electrical circuit 3, it follows that the movement of the pointer 23 is a measure of the power of the electrical circuit 3.

It may be noted that if only one of the windings 30 or 31 is energized, only one of the magnetic vanes is directly magnetized. For example, let it be assumed that the winding 30 is energized. The energization of the winding 30 magnetizes the magnetic vane 5. By induction the magnetic vane 6 also is magnetized in such a direction that the adjacent polar portions of the magnetic vanes 5 and 6 have opposite polarities. Consequently, a magnetic force of attraction is produced between the two vanes 5 and 6. However, since this force of attraction merely tends to urge the pointer 23 against the stop pin 24 the utility of the measuring device is not affected thereby.

By modifying the construction of the magnetic vane 5 somewhat, the efficiency of the measuring device 1 may be somewhat improved. Referring to Fig. 2, a measuring device 52 is disclosed which includes a number of the parts illustrated in Fig. 1. The windings 30 and 31, the movable magnetic vane 6 and the pointer 23 are again employed in substantially the same manner. For simplicity of illustration, the support for the movable vane 6 is omitted in Fig. 2.

In Fig. 2 a fixed magnetic vane 55 is employed which has two polar projections 55a and 55b adjacent opposite ends of the movable magnetic vane 6. With such a fixed magnetic vane, the only gaps in the magnetic circuit formed by the movable and fixed magnetic vanes are confined to the small gaps between each of the polar portions 55a and 55b and the movable magnetic vane 6. Consequently, somewhat increased magnetic efficiency results. The fixed magnetic vane 55 which replaces the magnetic vane 5 of Fig. 1 may be supported on the support 12 by means of two slotted abutments 58 to which the magnetic vane 55 is attached.

It will be observed that the two windings 30 and 31 in Fig. 2 have their axes substantially parallel to each other. In order to reduce the interaction or mutual inductive coupling between the two windings, suitable shielding means may be interposed therebetween. If the device is designed for alternating current operation, such shielding means may take the form of electroconductive material 60 such as copper which is interposed between the two windings. The provision of shielding for reducing the interaction between two adjacent windings is well understood in the art. Since the measuring device of Fig. 2 otherwise conforms to that illustrated in Fig. 1, a further discussion of Fig. 2 appears unnecessary.

A still further modification of the invention is illustrated in Fig. 3. In Fig. 3 the winding 31, the movable vane 6 and the pointer 23 are again illustrated. For the purpose of simplicity, the supporting structure for the movable vane 6 is not shown in Fig. 3.

No fixed magnetic vane corresponding to the magnetic vane 5 of Fig. 1 is employed in Fig. 3. To eliminate the fixed magnetic vane, the winding 30 is replaced by a winding 70 having a diameter sufficiently small to permit its placement within the winding 31. The axis of the winding 70 is substantially parallel to the axis of the movable vane 6. When the winding 70 is energized in a manner analogous to the energization of the winding 30 of Fig. 1, a magnetic field is produced by the winding 70 adjacent the movable magnetic vane 6. The magnetic field produced thereby cooperates with the magnetization of the movable magnetic vane 6 to produce a magnetic force tending to attract or repulse the magnetic vane 6 depending upon the direction of energization of the movable coil 70. Preferably the energization of the winding 70 is designed to produce a magnetic force of repulsion. For this reason, when the winding 70 is energized similarly to the energization of the winding 30 in Fig. 1, the operation of the movable vane 6 is substantially similar to that discussed with reference to Fig. 1.

With the construction of Fig. 1, the force exerted on the movable vane by a predetermined energization of the windings decreases as the movable vane moves away from the fixed vane. However, the scale may be calibrated readily to indicate the measured quantity.

If it is desired to make the force exerted on the movable vane independent of the position of the vane, either or both of the vanes may be specially shaped. For example, the fixed vane 5 of Fig. 1 may take the shape of the corresponding fixed vane 5a of Fig. 4. The instrument of Fig. 4 otherwise is similar to that of Fig. 1.

Although the invention has been described with reference to certain specific embodiments thereof numerous modifications are possible. Therefore, the invention is to be restricted only by the appended claims.

We claim as our invention:

1. In an electrical wattmeter, a voltage winding for producing a first magnetic field, a current winding for producing a second magnetic field, a separate magnetic member positioned in each of said magnetic fields to carry a magnetic flux produced by the associated magnetic field, said magnetic members having portions cooperating to develop a magnetic force therebetween dependent on the magnetizations of said magnetic members, means mounting one of said magnetic members for rotation relative to the other of said magnetic members in response to said magnetic force, means yieldably biasing said magnetic members against said rotation, and means for indicating the extent of said rotation.

2. In an electrical measuring device, an electrical circuit, means for producing a pair of magnetic fields, said means comprising a voltage winding, means connecting said voltage winding for energization in accordance with the voltage of said electrical circuit, a current winding, and means connecting said current winding for energization in accordance with current flowing in said electrical circuit, means supporting said windings in fixed relationship relative to each other, said windings being disposed to have substantially no mutual inductive coupling, magnetic means positioned in a first magnetic field produced by current flowing in a first one of said windings, means mounting said magnetic means for movement relative to said windings, said magnetic means including a magnetic portion positioned in proximity to a second magnetic field produced by current flowing in a second one of said windings, whereby the reaction between said second magnetic field and magnetic flux produced in said magnetic means by said first-named magnetic field creates a magnetic force operating to move said magnetic means in accordance with a function of the product of the voltage and current of said electrical circuit.

3. In an electrical measuring device responsive to a function of the product of voltage and current, an electrical circuit, a voltage winding, means connecting said voltage winding for energization in accordance with the voltage of said electrical circuit, a current winding, means connecting said current winding for energization in accordance with current flowing in said electrical circuit, means supporting said windings in fixed relationship relative to each other, said windings being disposed to have substantially no mutual inductive coupling, first magnetic means positioned in the magnetic field produced by current flowing in said voltage winding, second magnetic means positioned in the magnetic field produced by current flowing in said current winding, means mounting one of said magnetic means for movement relative to the other of said magnetic means, said magnetic means having coacting portions positioned to produce a magnetic force therebetween when said magnetic means carries magnetic flux, whereby the degree of relative movement of said magnetic means is a function of the voltage and current of said electrical circuit.

4. In an electrical wattmeter, an electrical circuit, a voltage winding, means connecting said voltage winding for energization in accordance with the voltage of said electrical circuit to produce a first magnetic field, a current winding, means connecting said current winding for energization in accordance with current flowing in said electrical circuit, means supporting said windings in fixed relationship relative to each other, said windings being disposed to have substantially no mutual inductive coupling, a magnetic member positioned in said first magnetic field for magnetization in accordance with the voltage of said electrical circuit, a magnetic member positioned in said second magnetic field for magnetization in accordance with current flowing in said electrical circuit, said magnetic members having cooperating portions positioned to develop a magnetic force therebetween which is dependent on the electrical power of said electrical circuit, means mounting one of said magnetic members for rotation relative to the other of said magnetic members under the influence of said magnetic force, yieldable means for opposing said rotation with a force increasing with said rotation, and means for indicating the extent of said rotation, whereby said indicating means indicates a function of the electrical power of said electrical circuit.

5. In an electrical measuring device for measuring a function of the product of voltage and current in an electrical circuit, a voltage winding for producing a first magnetic field, a first magnetic member positioned in said first magnetic field to carry magnetic flux produced by said voltage winding, a current winding for producing a second magnetic field, a second magnetic member positioned in said second magnetic field to carry magnetic flux produced by said current winding, said second magnetic member having a portion normally carrying said last-named magnetic flux positioned adjacent said first magnetic member to develop a magnetic force acting between said members, means mounting one of said magnetic members for movement relative to the other of said magnetic members in response to said magnetic force, and means yieldably biasing said magnetic members against said relative movement.

6. In an electrical measuring device responsive to a function of the voltage and current of an electrical circuit, a first U-shaped magnetic member, a second magnetic member extending across the ends of said U-shaped member to form therewith substantially a magnetic loop having an air gap between the magnetic members forming the loop, means mounting said magnetic members for relative rotation about an axis parallel to the plane of said U-shaped member in a predetermined direction suitable for varying the air gap therebetween, an electrical winding surrounding a portion of said U-shaped magnetic member for producing a first magnetic flux therein tending to traverse said magnetic loop, an electrical winding surrounding a portion of said second magnetic member for producing a second magnetic flux tending to traverse said magnetic loop, said magnetic fluxes cooperating to produce a magnetic force urging said second magnetic member in said predetermined direction relative to said U-shaped magnetic member, and means yieldably opposing movement of said second magnetic member relative to said U-shaped member, whereby energization of said windings respectively in accordance with voltage and current of an electrical circuit produces movement of said second magnetic member relative to said U-shaped member in accordance with a function of the product of the voltage and current, said windings being constructed for energization respectively in accordance with the voltage and the current of an electrical circuit.

7. In an electrical measuring device responsive to a function of the product of voltage and current in an electrical circuit, a voltage winding for producing a first magnetic field, a first magnetic member positioned in said first magnetic field to carry magnetic flux produced by said voltage winding, a current winding for producing a second magnetic field, a second magnetic member positioned in said second magnetic field to carry magnetic flux produced by said current winding, said second magnetic member having a portion normally carrying said last-named magnetic flux positioned adjacent said first magnetic member to develop a magnetic force acting between said members, means mounting one of said magnetic members for movement relative to the other of said magnetic members in response to said magnetic force, said magnetic members being configured to produce a magnetic force therebetween which is substantially independent of relative movement of said magnetic members over a substantial range of movement, and means yieldably biasing said magnetic members against said relative movement.

8. In an electrical measuring device responsive to a function of the volt-amperes in an electrical circuit, a pair of windings designed for energization respectively in accordance with the voltage and current of an electrical circuit, a magnetic member disposed within a first one of said windings, said magnetic member having a magnetic flux produced therein which is dependent on the current flowing in said first one of said windings, said magnetic member having a portion positioned in the magnetic field produced by current flowing in a second one of said windings for developing by the reaction between said magnetic flux and said magnetic field a force dependent on the product of the currents flowing through said windings, and means mounting the magnetic member for rotation relative to the second one of the windings by said force.

9. In an electrical measuring instrument responsive to a function of the volt-amperes in an electrical circuit, a winding designed for energization in accordance with the voltage of an electrical circuit, a magnetic member disposed within said winding, said magnetic member having a magnetomotive force applied thereto which is dependent on the current flowing in said winding, a winding designed for energization in accordance with the current of an electrical circuit, a magnetic member disposed within the last-named winding, said last-named magnetic member having a magnetomotive force applied thereto which is dependent on the current flowing in said last-named winding, said magnetic members having portions adjacent each other to develop by the reaction of the magnetic fluxes flowing therein a force therebetween dependent on a function of the product of the currents flowing through said windings, and means mounting one of said magnetic members for rotation relative to the other of said magnetic members in response to said force.

HOWARD F. BUSH.
RICHARD C. HITCHCOCK.